US007452590B1

(12) United States Patent
Benim et al.

(10) Patent No.: US 7,452,590 B1
(45) **Date of Patent: *Nov. 18, 2008**

(54) HEAT SHRINKABLE INSULATED PACKAGING MATERIAL

(75) Inventors: Thomas Edward Benim, Goodlettsville, TN (US); Susan G. Chamberlin, Pittsford, NY (US); Jeffrey Allen Chambers, Hockessin, DE (US); Steven R. Cosentino, Quinton, VA (US); Peter R. Hunderup, Hockessin, DE (US); Ross A. Lee, Chesapeake City, MD (US); Susan D. Procaccini, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/413,344

(22) Filed: Apr. 28, 2006

Related U.S. Application Data

(63) Continuation of application No. 10/270,801, filed on Oct. 15, 2002, now Pat. No. 7,108,906, which is a continuation-in-part of application No. 09/832,503, filed on Apr. 11, 2001, now Pat. No. 7,070,841.

(51) Int. Cl.
*B32B 7/02* (2006.01)

(52) U.S. Cl. ...................... 428/212; 428/40.1; 428/213; 428/113; 428/200; 428/204; 428/34.9; 428/913; 40/310; 283/81

(58) Field of Classification Search ................. 428/212, 428/113, 213, 200, 204, 34.9, 913, 40.1; 40/310; 283/81
See application file for complete search history.

(56) References Cited

U.S. PATENT DOCUMENTS

| | | | | |
|---|---|---|---|---|
| 3,401,475 | A | 9/1968 | Morehouse et al. | |
| 4,273,816 | A * | 6/1981 | Tollette | 428/34.2 |
| 4,626,455 | A * | 12/1986 | Karabedian | 428/34.7 |
| 4,871,597 | A | 10/1989 | Hobson | |
| 5,079,057 | A * | 1/1992 | Heider | 428/36.5 |
| 5,164,254 | A | 11/1992 | Todd et al. | |

(Continued)

FOREIGN PATENT DOCUMENTS

| | | |
|---|---|---|
| DE | 130564 | 4/1978 |

(Continued)

OTHER PUBLICATIONS

Encyclopedia of Polymer Science and Engineering, vol. 16, Styrene Polymers to Toys, John Wiley & Sons, NY, 1989, pp. 737-738.

(Continued)

*Primary Examiner*—Jane Rhee

(57) ABSTRACT

An insulating label stock or sleeve formed from such label stock includes a thermal insulating layer, which may a fiberfill batt. The batt is laminated to at least one layer of heat shrinkable material, such as a film. The insulated packaging material may be coated with a coating material to enhance printing capabilities. The insulating label stock or sleeve is installed around a container, and after being activated by heating, conforms to the contours of the container. The insulating label stock retains its hot and cold insulative properties after being heat-shrunk.

15 Claims, 6 Drawing Sheets

U.S. PATENT DOCUMENTS

| | | | | |
|---|---|---|---|---|
| 5,190,609 | A * | 3/1993 | Lin et al. | 156/85 |
| 5,223,315 | A * | 6/1993 | Katsura et al. | 428/36.92 |
| 5,358,804 | A * | 10/1994 | Will et al. | 429/167 |
| 5,404,667 | A | 4/1995 | Schmitter | |
| 5,453,326 | A | 9/1995 | Siddiqui | |
| 5,527,600 | A | 6/1996 | Frankosky et al. | |
| 6,150,013 | A | 11/2000 | Balaji et al. | |
| 6,286,872 | B2 | 9/2001 | Barre | |
| 6,379,764 | B1 | 4/2002 | Pusateri et al. | |
| 6,422,605 | B1 * | 7/2002 | Lind | 283/81 |
| 6,680,097 | B1 * | 1/2004 | Amberger et al. | 428/40.1 |

FOREIGN PATENT DOCUMENTS

| | | | |
|---|---|---|---|
| EP | 0101340 | A1 | 2/1984 |
| EP | 1064897 | A1 | 1/2001 |
| WO | WO 91/04152 | A1 | 4/1991 |

OTHER PUBLICATIONS

Handbook of Physical and Mechanical Testing of Paper and Paperboard, vol. 2, Edited by Richard E. Mark and Koji Murakami, Marcel Dekker Inc., NY, p. 250.

Operation Manual, Q Test, Automated Operation Using the Controller, Heat Flow Meter Thermal Conductivity Instrumentation, Holometrix Inc., Bedford, MA, p. A1-1.

www.3M.COM, 3M™ Composite Electrical Tape.

McIntyre, Professor J. E., Daniels, P.N., Editors, Textile Terms and Definitions, 1997, p. 66, p. 351, 10$^{TH}$ Edition, The Textile Institute, Biddles Limited, UK.

* cited by examiner

HEAT SHRINKABLE INSULATED PACKAGING MATERIAL

CROSS-REFERENCE TO RELATED APPLICATION

This application is a continuation of U.S. patent application Ser. No. 10/270,801, filed Oct. 15, 2002, now allowed, which is a continuation-in-part of U.S. patent application Ser. No. 09/832,503, filed Apr. 11, 2001, now allowed.

BACKGROUND OF THE INVENTION

1. Field of the Invention

The present invention relates to an insulated packaging material which comprises a thermal insulating layer which is laminated to a heat-shrinkable face material. The face material can be coated with a coating material so that it is printable, thus imparting both insulating properties and print capability to the packaging material. The packaging material can be heat-shrunk to conform to complex curved surfaces.

2. Description of Related Art

Insulated enclosures for containers are known, such as that disclosed in U.S. Pat. No. 4,871,597. This enclosure includes a first, or inner-most fabric layer, a second inner-most insulating layer which includes a polymeric foam, a third inner-most metallized polymer film reflective layer, and an outer-most fabric mesh layer. However, the use of four different layers, although providing good insulation for the container, can be cumbersome, which limits the flexibility of the container.

Also known in the film art is a thin electrical tape which comprises a polyester web-reinforced polyester film, as disclosed in 3M Utilities and Telecommunications OEM. However, this tape, which at its thickest is 0.0075 inch (0.0190 cm.), is not suitable for use as an insulated packaging material.

Thus, there exists a need to design an insulated packaging material which is inexpensive to manufacture. Such an insulator would be thick enough to provide adequate insulation, but thin enough to be flexible. It also would be advantageous to have such a material that may be heat-shrunk to fit over containers with simple and/or complex contours without losing insulation properties.

BRIEF SUMMARY OF THE INVENTION

The present invention overcomes the problems associated with the prior art by providing an insulated packaging material. This insulated packaging material has enough loft, i.e., is thick enough (greater than 0.0075 inch (0.0190 cm)) so as to provide adequate insulation when used, for example, as an insulated pouch, but is thin enough so that it is flexible. The insulated packaging material of the present invention is printable, thereby enhancing its use as a packaging material.

In accordance with the present invention, the insulated packaging material of the present invention comprises a thermal insulating layer having a thermal resistance of 0.05 to 0.5 CLO (0.0077 to 0.077 $m^2$. K/W) which is laminated to a face material, wherein the insulated packaging material has a thickness in the range of 0.0075 inch (0.0190 cm) and 0.07 inch (0.1778 cm). In the preferred embodiment, the insulating label stock comprises a thermal insulating layer, such as a fiberfill batt, having a thermal insulating value in the range of 0.05 to 0.5 CLO that has been laminated to at least one, most preferably two, heat shrinkable face materials. The insulating label stock has a thickness of at least 0.0075 inch (0.0190 cm). The insulating label stock may be formed into a sleeve into which a container may be inserted. Once heated, the heat shrinkable face material within the sleeve will shrink causing the sleeve to conform to the contours of the container. Most preferably, a first and a second heat shrinkable face material are laminated to the facing surfaces of the insulating material, where the second heat shrinkable face material has a different thermal shrinkage property such that it will shrink at a different rate than the first heat shrinkable material when the two materials are heated to the same temperature. With this most preferred embodiment, the label stock and insulating sleeve formed from the label stock can be formed to more uniformly conform to the contours of the container to be insulated.

DETAILED DESCRIPTION OF THE INVENTION

In accordance with the present invention, there is provided an insulated packaging material. Such a material is shown generally at 5 in FIG. 1 and rolled up at 220*a* in FIG. 6. The packaging material is cut into individual lengths to make labels or packages, such as pouches, which are shown applied to containers at 15 in FIGS. 2-5.

Figure 1:
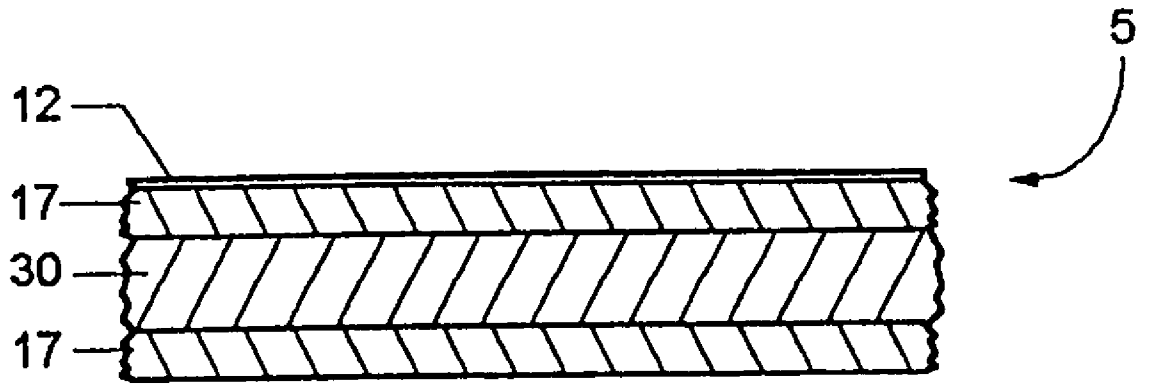
FIG. 1 is a cross-sectional view of an alternate embodiment of an insulated packaging material according to the present invention, showing a heat-shrinkable face material on both sides of a thermal insulating layer.
Figure 2:
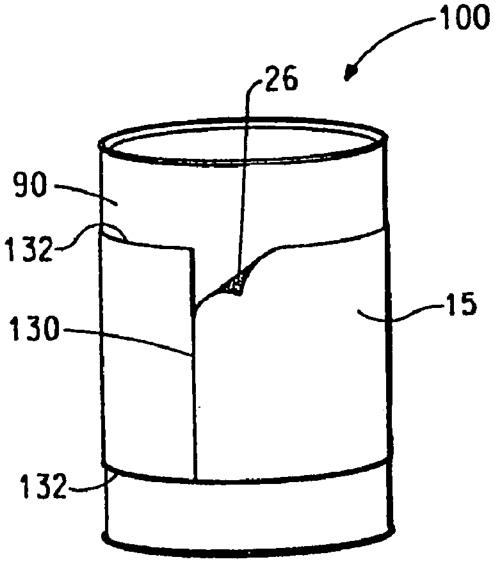
FIG. 2 is a perspective view of a container wrapped with a label cut from a label stock in accordance with the present invention.

In a first aspect, the insulated packaging material of the present invention includes a thermal insulating layer, shown at 30 in FIG. 1. This thermal insulating layer has a thermal resistance, as measured in units of insulation, or CLO, of 0.05 to 0.5. The CLO unit is defined as a unit of thermal resistance of a garment. The SI unit of thermal resistance is the square-meter kelvin per watt ($m^2 \cdot K/W$) (See "Textile Terms and Definitions", Tenth Edition, The Textile Institute, (1995), pp. 66, 350). Thus, the range of thermal resistance in SI units of the thermal insulating layer of the present invention is 0.0077 to 0.077 $m^2 \cdot K/W$. Although CLO is defined in terms of a garment, this measurement can be used to describe the thermal resistance of any textile system, and is used herein to describe the thermal resistance of the thermal insulating layer of the present invention. CLO values depend on the material used for the insulating layer and its thickness. CLO values of labels made without the thermal insulating layer of the present invention were below the lower end of the range (0.05 CLO, or 0.0077 $m^2 \cdot K/W$).

The thermal insulating layer comprises an organic thermoplastic fiber based material comprising polyester, polyethylene or polypropylene. In a preferred embodiment, the thermal insulating layer is a fiberfill batt comprising polyester. A fiberfill batt sold as THERMOLITE® Active Original by E.I. du Pont de Nemours and Company is especially suitable for use with the present invention. The fiberfill batt used with the present invention has an areal weight in the range of 10 $gm/m^2$ to 200 $gm/m^2$, and a bulk density of less than 0.3 $gm/cm^3$. Alternatively, the thermal insulating layer may comprise melt blown fibers, such as melt blown polyolefins, sold as THINSULATE®, by 3M.

Many other variations of insulating material for the thermal insulating layer can be used with the present invention. For instance, the thermal insulating layer 30 may comprise a foam. The foam may be polyurethane or polypropylene, or any other foam composition as known in the art. Or the thermal insulating layer may be made of an inorganic thermoplastic fiber based material comprising glass wool, borosilicate glass or rockwool.

Alternatively, the thermal insulating layer 30 may comprise a knit fabric, made, for example from a tetrachannel or scalloped oval fiber, sold under the trademark COOLMAX® by E.I. du Pont de Nemours and Company of Wilmington, Del. Or the thermal insulating layer may be a woven or fleece material. The insulating layer could also comprise some sort of nonwoven, such as felt, or a highloft nonwoven or needled nonwoven fabric.

In the first aspect of the invention, the thermal insulating layer 30 is laminated to a face material, shown at 17 in FIG. 1. By "lamination" is meant uniting layers of material by an adhesive, such as a hot melt adhesive or other means. One suitable hot melt adhesive is a reactive polyurethane such as Type NP-2075-T by HB Fuller of St. Paul, Minn., USA. Another suitable adhesive is ADCOTE® offered by the Morton Division of Rohm and Haas Company, Philadelphia, Pa., USA.

The face material may be film, paper and/or fabric. The film is made of a thermoplastic material comprising either polyester, polyethylene or polypropylene. Suitable thermoplastic films may also include poly(vinyl chloride), polyethylene glycol (PETG) Eastman's EASTAR PETG copolyester 6763 (Eastman Chemical Company, Kingsport, Tenn. USA), PET/PETG blends, amorphous PET, oriented polystyrene (OPS) and oriented polypropylene (OPP).

In a particularly preferred embodiment, a co-extruded, solvent sealable, heat shrinkable polyester film (such as MYLAR® D868 film) is used. The outer surface layers of the film are composed of a polyester copolymer and are receptive to commonly used welding or sealing solvents for the manufacture of shrink sleeves, such as tetrahydrofuran (THF). For a MYLAR® D868 film having a thickness of 2 mil (0.0051 cm), the shrinkage in the long or "hoop" direction is in a range from 60 to 80% and the shrinkage perpendicular to the hoop direction is in a range from 0 to 10%. Thermal shrinkage is determined by measuring the length and width dimensions of a film sample, immersing the sample in 100° C. (212° F.) water bath for 30 minutes and then measuring the length and width to calculate the amount of film shrinkage.

In the embodiment illustrated in FIG. 1, the thermal insulating layer 30 is laminated between two sheets of film, paper or fabric 17. However, it is within the scope of the present invention to laminate a single sheet of face material to the thermal insulating layer. The use of a single sheet of face material will not affect the thickness of the packaging material substantially, since the thickness of the face material is insignificant compared to the total thickness of the packaging material. The packaging material of the present invention is greater than 0.0075 inch (0.0190 cm.) thick, so that it is thick enough to provide adequate insulation for a package. However, the packaging material should be thin enough to be flexible, and should be preferably less than 0.07 inch (0.1778 cm).

If the face material 17 does not have a surface suitable for printing, the packaging material of the present invention can further include a coating 12 on the face material 17. This coating 12 is printable, so that the packaging material 5 may also function as a label. The coating 12 is a standard print primer based on aqueous polymer dispersions, emulsions or solutions of acrylic, urethane, polyester or other resins well known in the art. (See, for example, U.S. Pat. No. 5,453,326). Alternatively, if the thermal insulating layer is previously printed, and the face material is clear, the need for coating the face material to make it printable may be eliminated.

The packaging material of the present invention may be sealed, such as with a hot knife, at its edges so that fluid cannot penetrate the edges of the label stock. Such edges are shown at 132 in FIGS. 2-5. Alternatively, the packaging material may be self-sealing. In this self-sealing configuration, the packaging material may be folded back onto itself, so that the top and bottom edges are already sealed. A package or pouch made from the packaging material of the present invention is preferably sealed so that fluid cannot penetrate the edges thereof.

The packaging material may also be formed into a sleeve or tube that can be placed over a container prior to application of heat to shrink the tube so that it conforms to the outer contours of the container.

Further in accordance with the present invention, there is provided an insulated container. Such containers are shown generally in FIGS. 2-6 at 100. The insulated packaging system comprises a container 100 wrapped with an insulating label stock so as to cover a significant portion of the surface area of the container. The container may be a can or bottle suitable for safe storage and consumption of beverages and foods. A can is shown at 90 and 110, respectively, in FIGS. 2 and 3, a bottle is shown at 115 in FIG. 4 and 115*a* in FIG. 4*a*. Or the container may be a cup as shown at 140 in FIG. 5. Alternatively, the container may be a pouch, and in some cases, the label may become the pouch itself.

The container is wrapped with an insulating label made from a label stock as described above with respect to FIG. 1. The label may be bonded either to the container, or to itself along overlapping edges, such as edge 130 in FIGS. 2-5.

Figure 3:
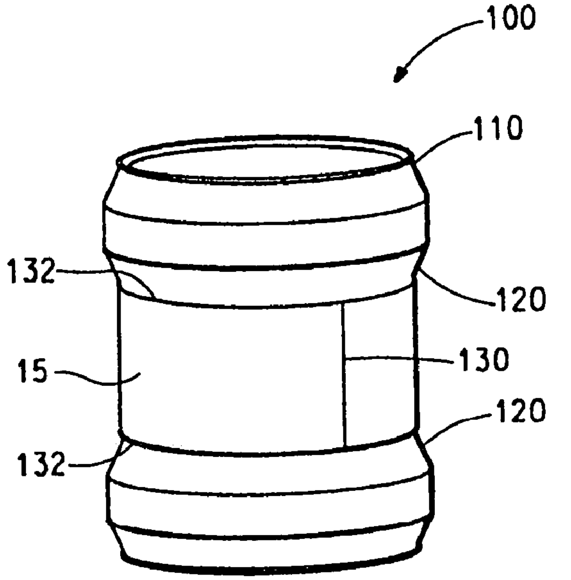
FIG. 3 is a perspective view of a container with indentations wrapped with a label cut from a label stock in accordance with the present invention.
Figure 4:
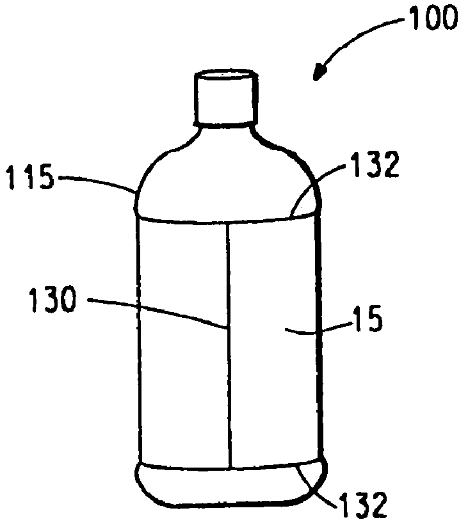
FIG. 4 is a perspective view of a bottle wrapped with a label cut from a label stock in accordance with the present invention.
Figure 5:
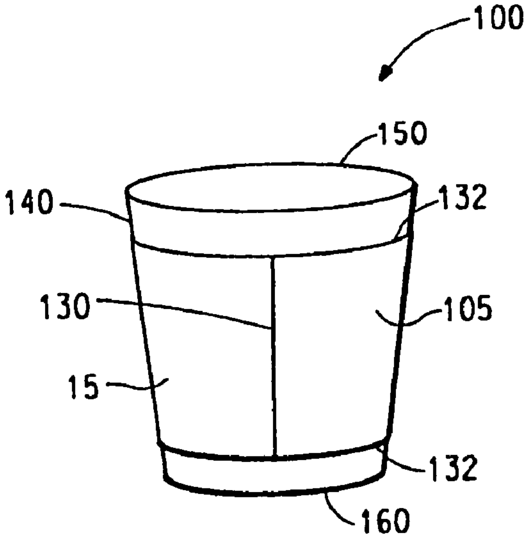
FIG. 5 is a perspective view of a cup wrapped with a label cut from a label stock in accordance with the present invention.

In the embodiment of FIG. 3, the label of the present invention is applied to can 110 which has been designed to have suitable indentations 120. These indentations hold the label in place if edges 130 of the label are secured to each other by adhesive or by heat-shrinking with the application of heat. In the embodiment of FIG. 5, cup 140 is of the type commonly used for single serving sizes of hot beverages, such as a disposable coffee cup. Alternatively, the cup may be a carton, such as an ice cream carton or other food carton.

If the cup is of a conic section design, as in FIG. 5, where the top circumference, shown at 150, is significantly larger than the bottom circumference, shown at 160, the label made from the label stock of the present invention may be shaped in a similar conic section shape so as to fit the cup snugly. In this case, either an adhesive holds the label on the cup, or the label is heat shrunk in place around the cup.

Instead of forming a unitary label stock, it is also possible to attach a thermal insulating layer to a container, and then adhere a face material to the thermal insulating layer. A face material, or shrink wrap cover label, could then be applied to the thermal insulating layer. An example of a thermal insulating layer which can be used in this configuration is a knit tube which is cut to length and slipped over the container (can or cup or bottle, etc.). Alternatively, a hot melt glue may be blown onto the container area that is to be insulated, building a layer of lofty fibrils to a desired thickness.

Referring to FIG. 1, the preferred embodiment, the insulating packaging material or label stock may be formed with face material 17 that is heat-shrinkable (shrinks by length and/or width when subjected to heating) so that the insulating packaging material or label stock 5 may be formed around containers with regular and irregular contours. An insulating layer, such as a fiberfill batt 30, has face material 17 adhered to each face thereof, preferably with a pressure-sensitive adhesive such as solvent based natural rubber, vinyl acetate, solvent and aqueous based acrylics and polyurethanes. A coating 12 may be applied to the opposite surface of one of the face material 17 layers to accommodate printing inks. Alternatively, a surface of the insulating layer 30 may be printed or embossed in advance of lamination to the face material 17.

Preferred heat-shrinkable films that may be used for the face material 17 include: polyester, polypropylene or polyethylene. Suitable heat-shrinkable thermoplastic films may also include poly(vinyl chloride), polyethylene glycol (PETG) Eastman's EASTAR PETG copolyester 6763 (Eastman Chemical Company, Kingsport, Tenn. USA), PET/PETG blends, amorphous PET, oriented polystyrene (OPS) (such as LABELFLEX® from Plastic Suppliers of Columbus, Ohio USA) and oriented polypropylene (OPP). A polyester heat shrinkable film sold under the trademark MYLAR® D868 or MYLAR® D868 by DuPont Teijin Films of Wilmington, Del. USA has been successfully used. Heat shrink films that are activated by radiant heat and microwave radiation may be used in the present invention.

The face material 17 may be formed of a heat shrink material that shrinks preferentially in one dimension, such as lengthwise or "hoopwise" to surround a container. This type of heat shrink material generally has better visual aesthetics due to more predictable post-shrink size and less distortion than materials that shrink both latitudinally and longitudinally. In addition, generally a lesser amount of directional-preferentially shrinking material is required to cover a container surface.

Although the embodiment shown in FIG. 1 has the same heat shrinkable face material 17 adhered on each facing surface of the insulating layer 30, it is also within the scope of the present invention to adhere different heat-shrinkable face materials on each facing surface, or to adhere a non-heat-shrinking film to one surface and a heat-shrinkable film to the opposite surface of insulating layer 30. When heat shrinkable films with different thermal shrinkage properties are attached to each face of the insulating layer, a more uniform shrinkage around a container may be obtained. For example, an inner film may shrink more than an outer film, such that the label stock more uniformly conforms to the container shape after the films have been shrunk by heating. This could be helpful to more uniformly cover a container surface where the insulating material 30 makes it difficult to heat both face layers 17 in FIG. 1 to the same temperature contemporaneously. Moreover, for applying labels to containers with unusual profiles, it can be advantageous to modify the shrink initiation temperature, shrinkage rate, or the maximum obtainable shrinkage of either the inner face layer or the outer face layer to obtain a tight and wrinkle-free label.

Figure 4A:
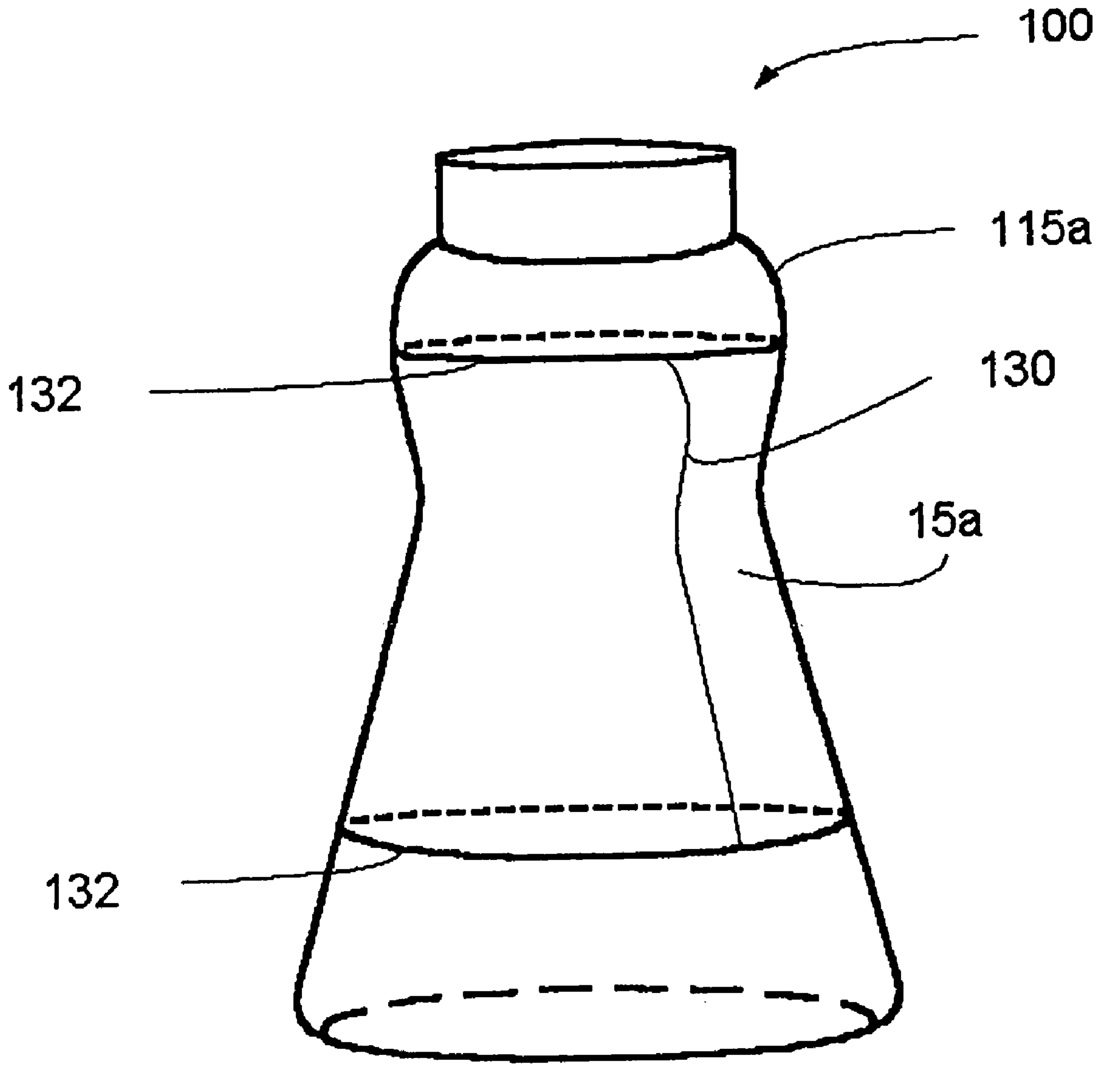
FIG. 4*a* is a perspective view of a container with a complex curved exterior that has been wrapped with a label cut from a label stock and heat-shrunk to adapt to the complex curved exterior in accordance with the present invention.

As shown in FIG. 4*a*, the insulating label stock 15*a* has been wrapped around the outer circumference of irregularly contoured bottle 115*a*. The insulating label stock was formed into a sleeve (not shown) by sealing edges 130 before placing the insulating label stock around the container. As one method, sleeves are formed by looping the label stock and joining and sealing the cut edges together in a solvent welding process. After the sleeve is formed, either it is dropped over the container or the container is slid into the sleeve. Upon application of heat, such as by blowing heated air onto the bottle 115*a* in a shrink tunnel, the heat shrinkable film forming part of label 15*a* caused the label to shrink to fit around the curved contours of bottle 115*a*.

Further in accordance with the present invention, there is provided a method for making an insulated packaging material. This method is illustrated with reference to FIG. 6. In this method, a sheet of material used for the thermal insulating layer, such as fiberfill batt 30, is fed from a supply roll 45. An adhesive is applied between the face material 17 and the thermal insulating layer 30. This adhesive is applied by one or more coating rollers 225 which are positioned between feed rolls 40*a* and 50*a* and calender rolls 70*a* and 80*a* in FIG. 6. Here the adhesive is applied using a pair of kiss roll and pan assemblies, known in the art, represented by 225 and positioned between feed rolls 40*a* and 50*a* and calender rolls 70*a* and 80*a* in FIG. 6. Alternatively, adhesive might be applied with a sprayer or with an extruder (not shown in FIG. 6). Face material 17 is fed from supply rolls 40*a* and 50*a*, is coated with adhesive and laminated to a surface of the fiberfill batt 30. Such face material 17 is disposed such that any coating applied thereto (such as 12 shown in FIG. 1) is oriented away from thermal insulating layer 30. Face material 17 is a heat-shrinkable film, which, when heated, shrinks primarily "hoopwise" to surround a container.

Figure 6:
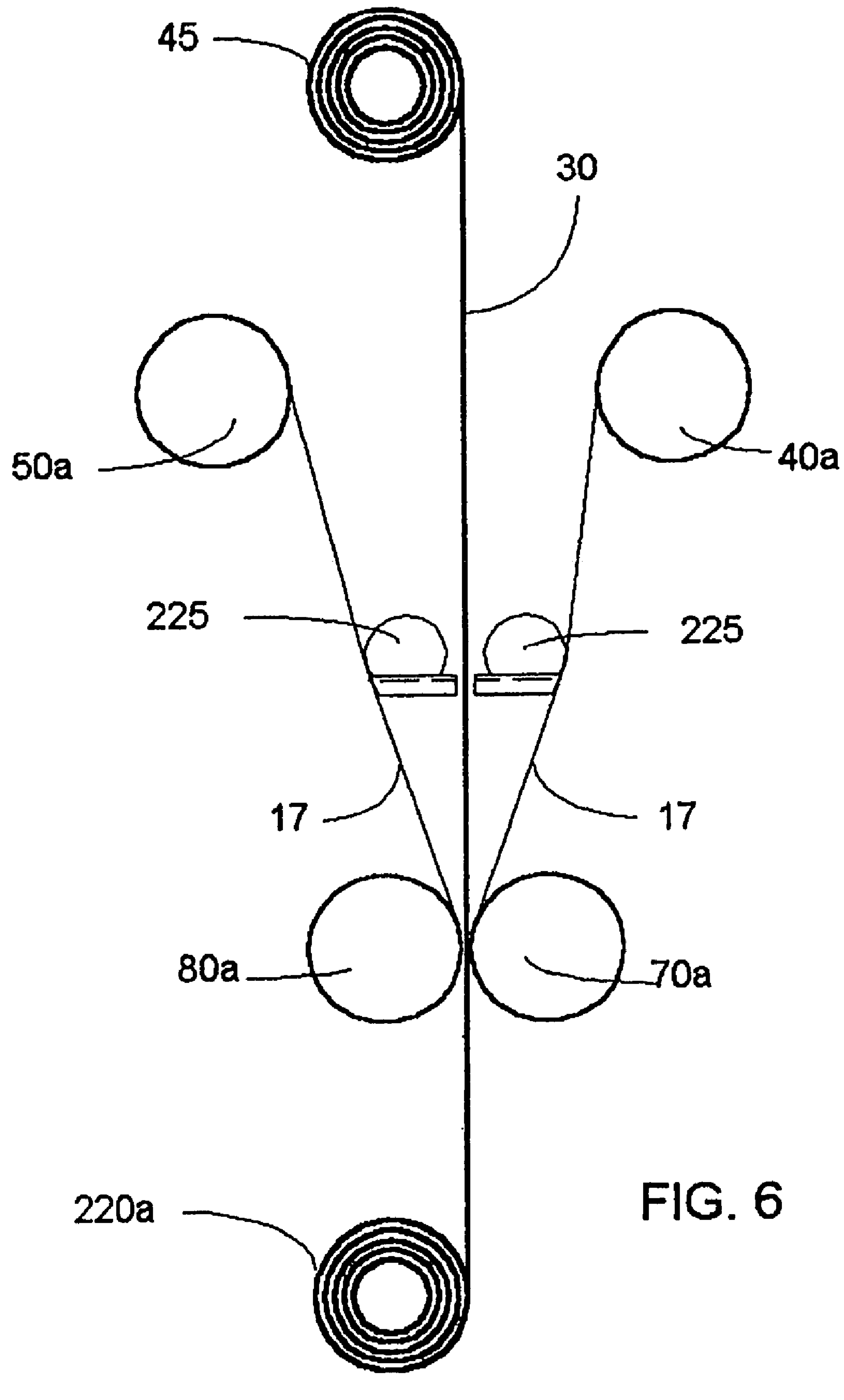
FIG. 6 is a schematic view of an apparatus suitable for making the label stock according to the present invention.

A sheet of the thermal insulating layer, such as 30, and at least one sheet of face material, such as 17, are fed into a calender roll nip between a pair of calender rolls 70*a* and 80*a*, shown in FIG. 6. The calender rolls 70*a* and 80*a* are not heated so as not to activate heat-shrinking face material 17. The calender rolls 70*a* and 80*a* are displaced from one another at a distance appropriate to create a nip pressure suitable for lamination. A packaging material is formed which is pulled through the process equipment by means of a take-up roll 220 as shown in FIG. 6.

A packaging material with a thickness of greater than 0.0075 inch (0.0190 cm.) but less than 0.07 inch (0.1778 cm), preferably between 0.010 inch (0.025 cm.) and 0.040 inch (0.102 cm.), and most preferably between 0.020 inch (0.051 cm.) and 0.030 inch (0.076 cm.) is thus produced. This packaging material 5 preferably is made with two sheets of face material, as in FIG. 1, since the thickness of the face material is insignificant compared to the total thickness of the material. The formation of the packaging material or label stock may be followed by cutting to desired widths with a hot knife which seals the edges of the package or the label stock. Alternatively, the edges may be sealed via solvent welding. The packaging material may then be cut to form pouches or sleeves, which may preferably have sealed edges.

The present invention will be illustrated by the following Example. The test method used in the Example is described below.

Test Method

For the following Examples, CLO was measured on a "Thermolabo II", which is an instrument with a refrigerated bath, commercially available from Kato Tekko Co. L.T.D., of Kato Japan, and the bath is available from Allied Fisher Scientific of Pittsburgh, Pa. Lab conditions were 21° C. and 65% relative humidity. The sample was a one-piece sample measuring 10.5 cm×10.5 cm.

The thickness of the sample (in inches) at 6 gm/cm$^2$ was determined using a Frazier Compressometer, commercially available from Frazier Precision Instrument Company, Inc. of Gaithersburg, Md. To measure thickness at 6 g/cm$^2$, the following formula was used to set PSI (pounds per square inch) (kilograms per square centimeter) on the dial:

$$\frac{(6.4516\ \text{cm}^2/\text{in}^2)(6\ \text{g/cm}^2)}{453.6\ \text{g}} = 0.8532\ \text{lb/in}^2$$

A reading of 0.8532 on the Frazier Compressometer Calibration Chart (1 in., or 2.54 cm. diameter presser foot) shows that by setting the top dial to 3.5 psi (0.2 kilograms per square centimeter), thickness at 6 g/cm$^2$ was measured.

The Thermolabo II instrument was then calibrated. The temperature sensor box (BT box) was then set to 10° C. above room temperature. The BT box measured 3.3 inch×3.3 inch (8.4 cm×8.4 cm). A heat plate measuring 2"×2" was in the center of the box, and was surrounded by styrofoam. Room temperature water was circulated through a metal water box to maintain a constant temperature. A sample was placed on the water box, and the BT box was placed on the sample. The amount of energy (in watts) required for the BT box to maintain its temperature for one minute was recorded. The sample was tested three times, and the following calculations were performed:

$$\text{Heat Conductivity(W/cm}\ ^\circ\ \text{C.)} = \frac{(\text{W})(D \times 2.54)}{(A)(\Delta T)}$$

Where:

W=Watts

D=Thickness of sample measured in inches at 6 g/cm$^2$. (6 g/cm$^2$ was used because the weight of the BT box is 150 gm, the area of the heat plate on the BT box was 25 cm$^2$). Multiplying the thickness by 2.54 converted it to centimeters.

$$A = \text{Area of B.T Plate(25 cm)}$$

$$\Delta T = 10^\circ\ \text{C.}$$

$$CLO = \frac{\text{Thickness} \times 0.00164}{\text{Heat Concuctivity}}$$

The value of 0.00164 was a combined factor including the correction of 2.54 (correcting thickness from inches to centimeters) times the correction factor of 0.0006461 to convert thermal resistance in cm$^2$×° C./Watts. To convert heat conductivity to resistance, conductivity was put in the denominator of the equation.

EXAMPLE 1

A heat shrinkable insulated packaging stock was made according to the process described above with respect to FIG. 6, in which the layers were adhered together using a hot melt adhesive. A fiberfill batt of the type sold by E.I. du Pont de Nemours and Company of Wilmington, Del. under the trademark THERMOLITE® Active Original was used as the thermal insulating layer. The fiberfill batt had an areal weight of 100 gm/m$^2$ at a specified thickness of 0.25 inch (0.63 cm), or a bulk density of 0.013 gm/cm$^3$. This batt was reduced in thickness, via needling and calendering, for this embodiment to about 0.030 inch (0.0012 cm).

The adhesive used was a reactive polyurethane-based material, type NP 2075-T by HB Fuller, Inc. of St. Paul, Minn., USA. The adhesive was applied to the above-described insulation as a hot melt extrusion using an Illinois Tool Works UFD extruder at a temperature of approximately 325° F. (162.8° C.). Using a Reliant laminating machine from Reliant Machinery Ltd. of Chesham, England, the face material 17 was placed in contact with the adhesive coated batt 30 and pressed together by unheated nip rolls 70*a* and 80*a* with zero gap. In this example, different from FIG. 6, the lamination was carried out step-wise, with one face film 17 being applied in one pass through the apparatus, followed by a second lamination in which the second face material 17*a* is applied in a similar manner to the opposite face of batt 30.

The heat shrinkable films used as the face material were of the type sold by DuPont Teijin Films of Wilmington, Del. under the trademark MYLAR® D868. In this embodiment, both face materials 17 were 2.0 mils (0.002 inch, or 0.005 cm) thick. The final label stock thickness, after lamination, was 0.025 inch (0.064 cm). A label was cut from this stock and applied to a contoured bottle. An electronic heat gun (model HG 3002 LCD) made by Steinel America Inc. of Bloomington, Minn., was used to apply approximately 350° F. (176.7° C.) air to the label and cause it to shrink to fit the contours of a bottle, such as a beverage bottle shown in FIG. 4*a*.

Figure 7:
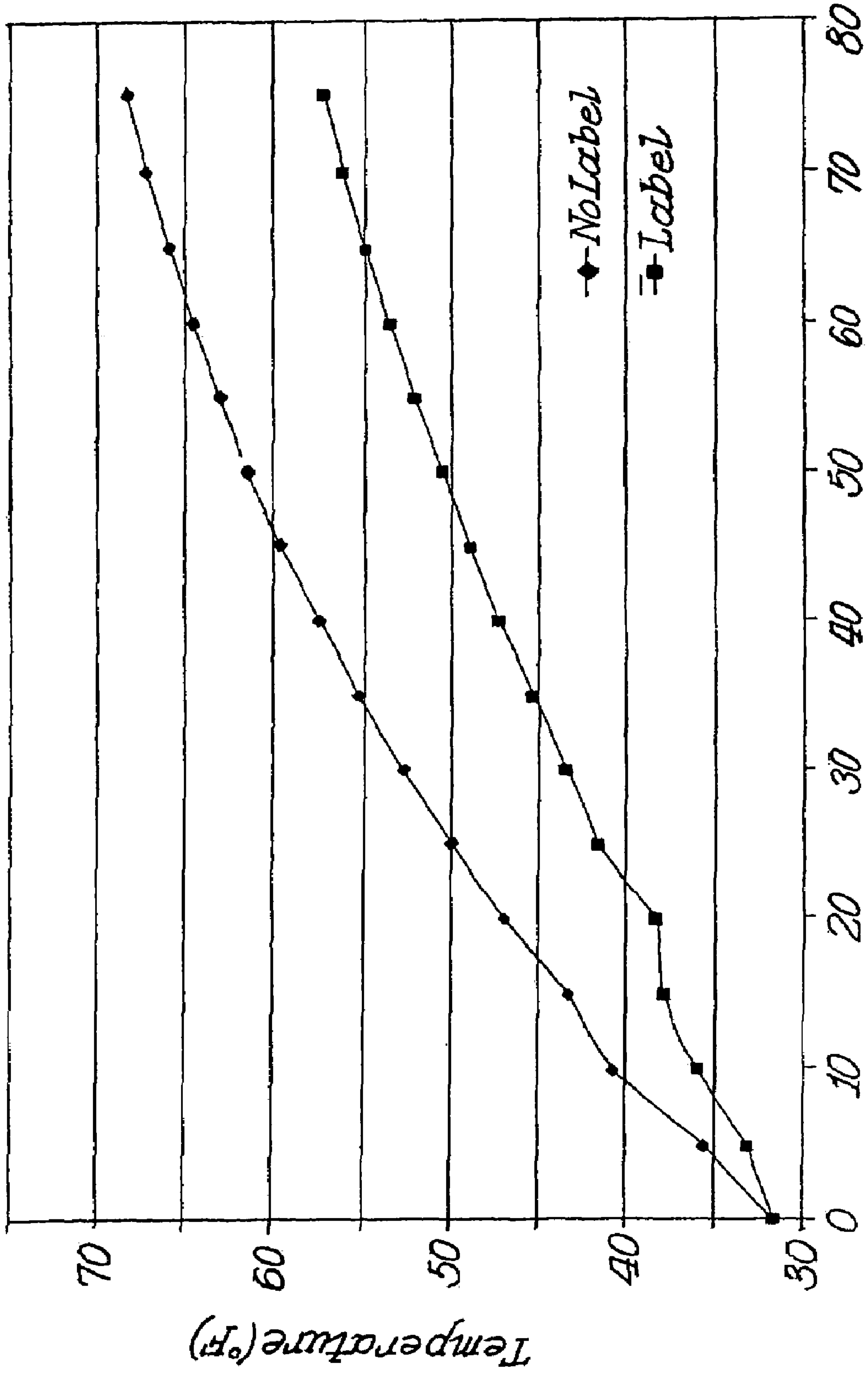
FIG. 7 is a graph showing the insulative properties to retain a cold temperature over time of a bottle heat-shrink wrapped with an insulating label stock according to the present invention.

A beverage bottle covered with the insulating label stock of the invention like that of FIG. 4*a* and a control bottle without the insulating label stock were each filled with cold water. Thermocouples (Fluke's Model 52-2T with bead probes, type 80PJ-1 from Fluke Corp. of Everett, Wash., USA) were inserted into the internal volume of each bottle to measure the temperature of the water held therein. Each bottle was also wrapped on the outside surface with a heating coil through which heated water (maintained at approx. 85° F.) was circulated to simulate being grasped by a person's hand. The temperature readings over time were plotted in FIG. 7. The graph in FIG. 7 shows that the insulated bottle maintained the cold temperature of the water contents therein for a longer period than the bottle without the insulated label stock.

Figure 8:
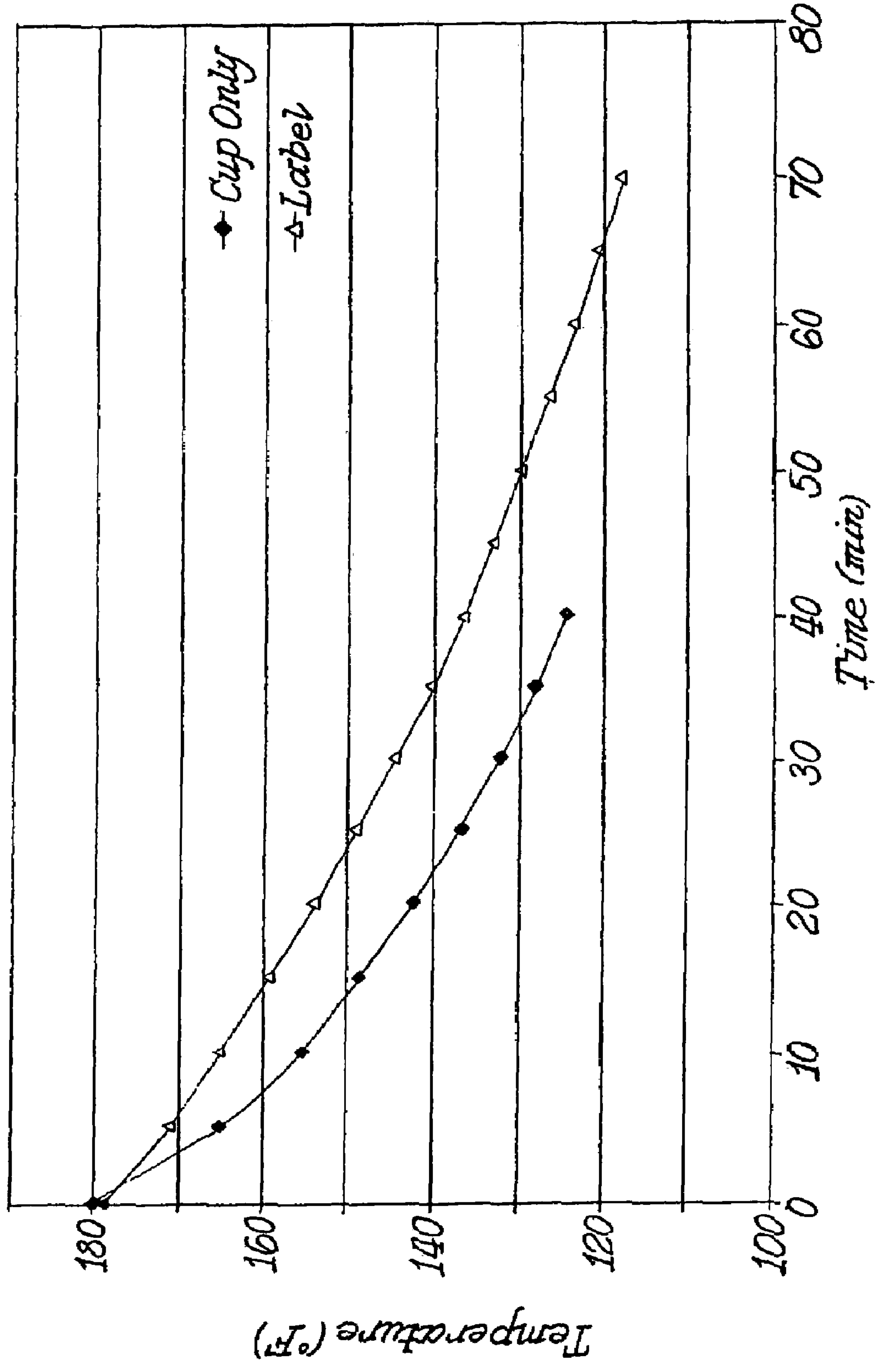
FIG. 8 is a graph showing the insulative properties to retain a hot temperature over time of a cup heat-shrink wrapped with an insulating label stock according to the present invention.

A coffee cup covered with the insulating label stock of the invention like that of FIG. 5 and a control cup without the insulating label stock were each filled with heated water. Thermocouples were inserted into the internal volume of each cup to measure the temperature of the water held therein. Each cup was then capped and maintained at room temperature and atmospheric conditions. The temperature measurements over time were plotted in FIG. 8. As shown in FIG. 8, the water held within coffee cup covered with the insulating label stock better retained its temperature over time.

The results presented graphically in FIG. 8 have practical application beyond maintaining the temperature of a heated beverage or food hotter for a longer period of time. Many foods and beverages are pasteurized or heated to a specified temperature for a specified time period (such as 160° F. for five or more minutes) to kill bacteria and prevent food or beverage contamination. Frequently, bottlers and other food container fillers will heat the contents of the container to temperatures much higher than the minimum temperature required (e.g. up to 190° F.) so that the container contents will stay above the minimum (e.g. 160° F.) even though convection heat losses will cause the temperature to go down over time. The insulating label stock and packaging material according to the invention maintains the container contents at a higher temperature over time, such that efficiencies may be obtained. For example, the maximum heating temperature may be lowered, which results in energy savings and may also mean that different container materials may be used that heretofore were avoided because they could not withstand the higher heating temperatures.

What is claimed is:

1. An insulating label stock, comprising:

a thermal insulating layer having a thermal resistance in the range of 0.05 to 0.5 CLO (0.0077 to 0.077 $m^2 \cdot K/W$) and having a first surface; and a heat shrinkable face material laminated directly to the first surface of the thermal insulating layer to form the label stock, wherein the label stock has a thickness of at least 0.0075 inches (0.0190 cm) and the thermal insulating layer comprises polyethylene, polypropylene, or polyester in the form of fiber, fiberfill batt, foam, knit fabric, woven material, or fleece material.

2. The insulating label stock of claim 1, wherein the face material is a film.

3. The insulating label stock of claim 2, wherein the thermal insulating layer has a second surface and a second heat shrinkable face material is laminated directly to the second surface.

4. The insulating label stock of claim 3, wherein the second heat shrinkable face material has a different thermal shrinkage and shrinks to a different degree than the heat shrinkable face material when the second heat shrinkable face material is heated to the same temperature as the heat shrinkable face material.

5. The insulating label stock of claim 2, wherein the thermal insulating layer comprises a fiberfill batt.

6. The insulating label stock of claim 1, wherein the heat shrinkable face material shrinks preferentially in one direction when heat is applied to the face material.

7. The insulating label stock of claim 1, wherein the heat shrinkable face material is formed from a material selected from the group consisting of: polyester, polyethylene, polypropylene, poly(vinyl chloride), PETG copolyester, PET/PETG blends, amorphous PET, oriented polystyrene and oriented polypropylene.

8. The insulating label stock of claim 1, wherein the heat shrinkable face material is laminated to the insulating layer with pressure sensitive adhesive.

9. An insulating sleeve formed from an insulating label stock wherein the insulating label stock is as recited in claim 1.

10. The insulating sleeve of claim 9 wherein the insulating label stock is as recited in claim 4.

11. A container insulated with an insulating label stock wherein the insulating label stock is as recited in claim 1.

12. The container of claim 11 wherein the insulating label stock is as recited in claim 4.

13. The container of claim 11 wherein the insulating label stock is as recited in claim 5.

14. The container of claim 11 wherein the container is insulated with the insulating sleeve as recited in claim 9.

15. The container of claim 14 wherein the insulating sleeve is as recited in claim 10.

* * * * *